(12) United States Patent
Bode et al.

(10) Patent No.: US 6,937,914 B1
(45) Date of Patent: Aug. 30, 2005

(54) METHOD AND APPARATUS FOR CONTROLLING PROCESS TARGET VALUES BASED ON MANUFACTURING METRICS

(75) Inventors: Christopher A. Bode, Austin, TX (US); Thomas J. Sonderman, Austin, TX (US); Alexander J. Pasadyn, Austin, TX (US); Anthony J. Toprac, Austin, TX (US); Joyce S. Oey Hewett, Austin, TX (US); Anastasia Oshelski Peterson, Austin, TX (US); Michael L. Miller, Cedar Park, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 842 days.

(21) Appl. No.: 09/789,872

(22) Filed: Feb. 21, 2001

(51) Int. Cl.[7] ............................................. G06F 19/00
(52) U.S. Cl. ...................... 700/121; 700/108; 702/182
(58) Field of Search .............................. 700/121, 108, 700/110; 257/E21.525; 438/14; 702/182

(56) References Cited

U.S. PATENT DOCUMENTS

| | | | | |
|---|---|---|---|---|
| 6,044,208 A | * | 3/2000 | Papadopoulou et al. ......... 257/E21.525 |
| 6,210,983 B1 | * | 4/2001 | Atchison et al. ............. 700/121 |
| 6,265,232 B1 | * | 7/2001 | Simmons ..................... 438/14 |
| 6,430,456 B1 | * | 8/2002 | Black et al. ................ 700/110 |
| 6,456,894 B1 | * | 9/2002 | Nulman ...................... 700/121 |

* cited by examiner

Primary Examiner—Albert W. Paladini
(74) Attorney, Agent, or Firm—Williams, Morgan & Amerson

(57) ABSTRACT

A method for controlling a tool adapted to process workpieces in accordance with an operating recipe based on a process target value is provided. The method includes collecting manufacturing characteristic data associated with the workpieces; correlating the manufacturing characteristic data with a first manufacturing metric to generate a first manufacturing metric distribution for the workpieces; and adjusting the process target value based on the first manufacturing metric distribution. A manufacturing system includes a processing tool and a target monitor. The processing tool is adapted to process workpieces in accordance with an operating recipe based on a process target value. The target monitor is adapted to collect manufacturing characteristic data associated with the workpieces, correlate the manufacturing characteristic data with a first manufacturing metric to generate a first manufacturing metric distribution for the workpieces, and adjust the process target value based on the first manufacturing metric distribution.

48 Claims, 3 Drawing Sheets

METHOD AND APPARATUS FOR CONTROLLING PROCESS TARGET VALUES BASED ON MANUFACTURING METRICS

BACKGROUND OF THE INVENTION

1. Field of the Invention

This invention relates generally to the field of semiconductor device manufacturing and, more particularly, to a method and apparatus for controlling process target values based on manufacturing metrics.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

The choice for a particular target value may not always represent the best choice for the manufacturing system. For example, if the target values are selected based on design values, the processes may be operating under conditions that seek to maximize the number of high speed devices. The supply of completed devices may not match the current output demands for the fabrication facility. For example, if a large number of high performing devices (i.e., more expensive devices) have been produced, but the current demand is for lower cost devices (i.e., slower), orders may not be able to be filled with the desired grade device. As a result, the manufacturer may be forced to sell devices of a higher grade at a lower price to fill the order. If the demand is for higher grade devices, and the supply of higher grade devices is diminished, the manufacturer may be unable to fill the order at all. Either situation results in lost profits for the manufacturer.

The present invention is directed to overcoming, or at least reducing the effects of, one or more of the problems set forth above.

SUMMARY OF THE INVENTION

One aspect of the present invention is seen in a method for controlling a tool adapted to process workpieces in accordance with an operating recipe based on a process target value. The method includes collecting manufacturing characteristic data associated with the workpieces; correlating the manufacturing characteristic data with a first manufacturing metric to generate a first manufacturing metric distribution for the workpieces; and adjusting the process target value based on the first manufacturing metric distribution.

Another aspect of the present invention is seen in a manufacturing system including a processing tool and a target monitor. The processing tool is adapted to process workpieces in accordance with an operating recipe based on a process target value. The target monitor is adapted to collect manufacturing characteristic data associated with the workpieces, correlate the manufacturing characteristic data with a first manufacturing metric to generate a first manufacturing metric distribution for the workpieces, and adjust the process target value based on the first manufacturing metric distribution.

BRIEF DESCRIPTION OF THE DRAWINGS

The invention may be understood by reference to the following description taken in conjunction with the accompanying drawings, in which like reference numerals identify like elements, and in which.

Figure 1:
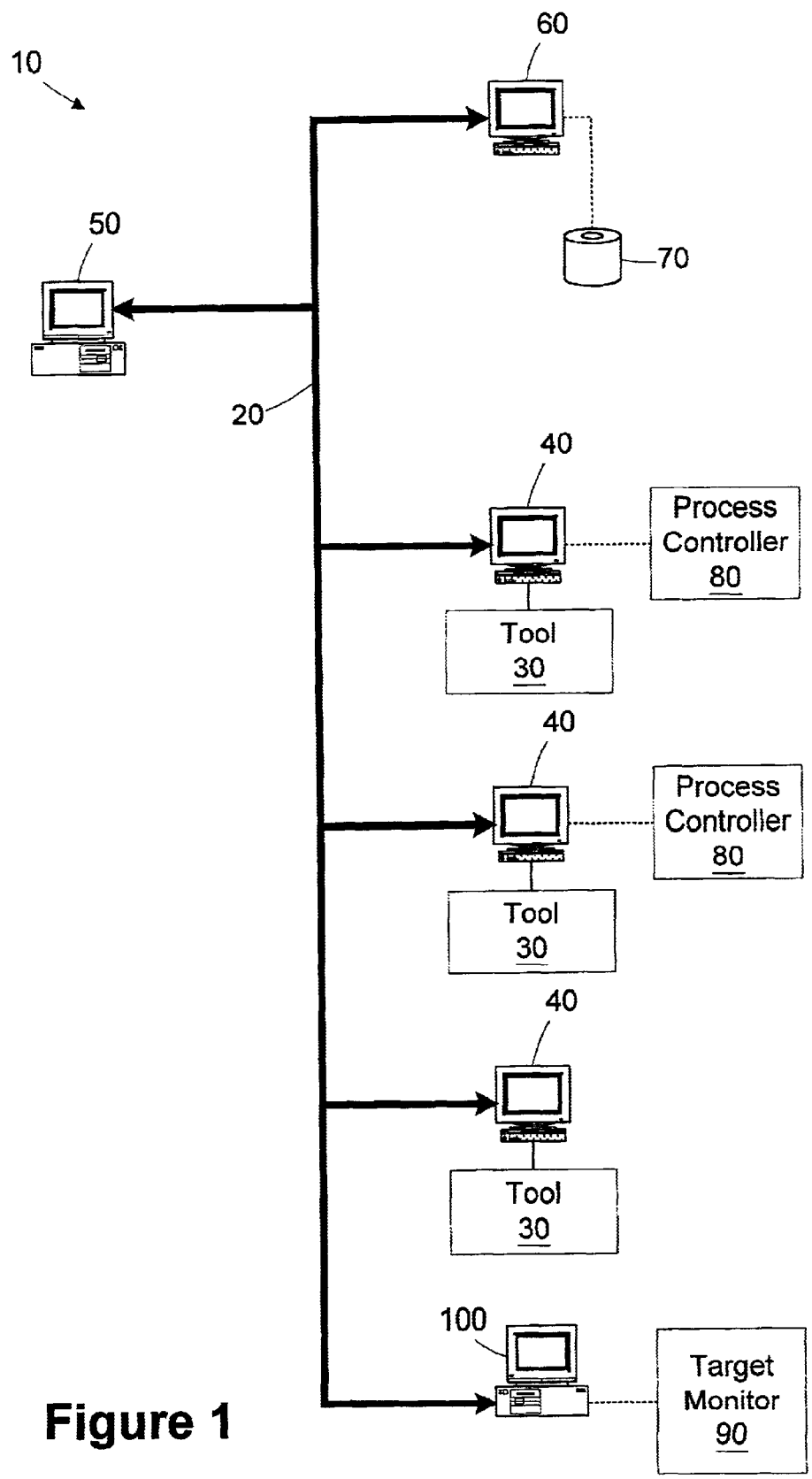
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system is adapted to process semiconductor wafers, however, the invention is not so limited and may be applied to other types of manufacturing environments and other types of workpieces. A network 20 interconnects various components of the manufacturing system, allowing them to exchange information. The illustrative manufacturing system 10 includes a plurality of tools 30, each being coupled to a computer 40 for interfacing with the network 20. A process control server 50 directs the high level operation of the manufacturing system 10 by directing the process flow of the manufacturing system 10. The process control server 50 monitors the status of the various entities in the manufacturing system, including the tools 30. The tools may be processing tools, such as photolithography steppers, etch tools, deposition tools, polishing tools, rapid thermal processing tools, implantation tools, etc., or metrology tools for measuring characteristics of the wafers being processed in the manufacturing system 10. A database server 60 is provided for storing data related to the status of the various entities and workpieces (e.g., wafers) in the process flow. The database server 60 may store information in one or more data stores 70. The data may include pre-process and post-process metrology data, tool states, process flow activities (e.g., scheduled maintenance events, processing routes for lots of wafers), etc. The distribution of the processing and data storage functions amongst the different computers 40, 50, 60 is generally conducted to provide independence and a central information store. Of course, more or less computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 include process controllers 80 that are adapted to automatically control the operating recipes of their respective tools 30. A particular tool 30 may have more than one process controller 80 adapted to control more than one operating recipe parameter. For example, if the tool 30 is a CMP tool, the process controller 80 may receive pre-polish thickness measurements (e.g., thickness of high features, thickness of low features) and predict a polishing time required to achieve a post-polish target thickness. In the case where the tool 30 is an etch tool, the process controller 80 may model the etching performance of the tool 30 based on pre-etch and/or post-etch thickness measurements. The process controller 80 may use a control model of the tool 30 to generate its prediction. The control model may be developed empirically using commonly known linear or non-linear techniques. The control model may be a relatively simple equation based model (e.g. linear, exponential, weighted average, etc.) or a more complex model, such as a neural network model, principal component analysis (PCA) model, or a projection to latent structures (PLS) model. The specific implementation of the model may vary depending on the modeling technique selected. Using the control model, the process controller 80 may determine operating recipe parameters such as etch time, plasma power, temperature, pressure, reactant gas concentrations, etc. to reduce post-etch thickness variations. Other control scenarios are possible with other types of processing tools 30.

The manufacturing system 10 also includes a target monitor 90 operating on a workstation 100 for monitoring the target values used by the process controllers 80 for controlling the operating recipes of the tools 30. The target monitor 90 may access the metrology data collected regarding the performance of the tools 30 and the overall manufacturing system 10 to determine manufacturing metrics such as speed, yield, power consumption, switching voltage, leakage current, etc., for the various lots of wafers and their associated devices. The target monitor 90 correlates the process metrology data and the target values to the manufacturing metrics to adjust the target values used by the process controllers 80.

Figure 2:
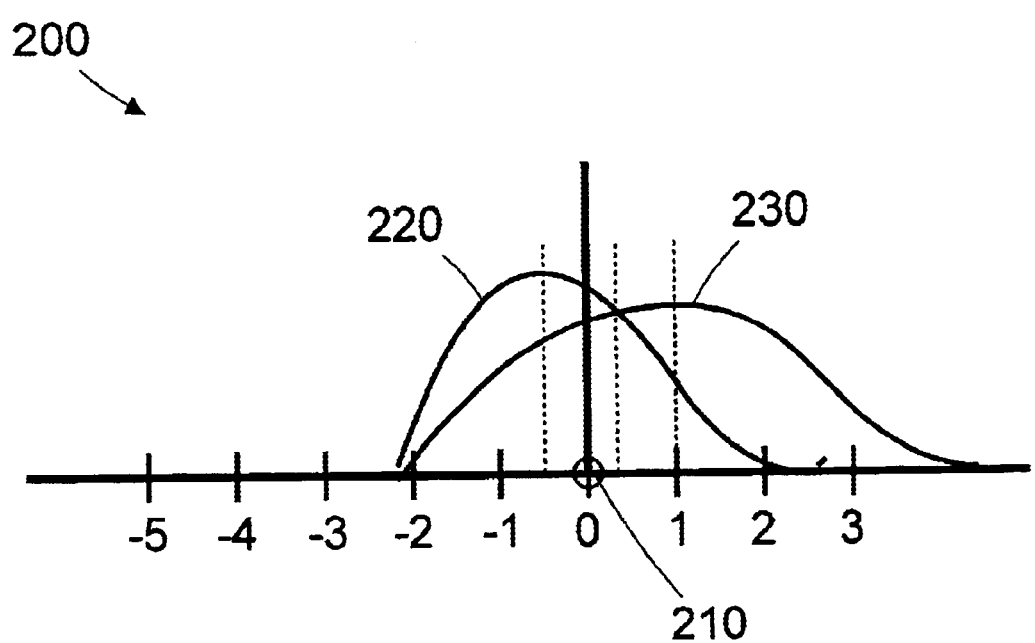
FIG. 2 is a graph illustrating how a particular device characteristic controlled by a process controller based on a target value correlates to various manufacturing metrics in the manufacturing system of FIG. 1.

FIG. 2 is a graph 200 illustrating how a particular device characteristic controlled by a process controller 80 based on a target value correlates to various manufacturing metrics. For example, the device characteristic may be a transistor gate electrode critical dimension having a target value 210 represented by the zero point on the x-axis. The values on the x-axis represent deviations from the target value 210 in units (e.g., each unit could represent 1 nanometer). For actual devices fabricated in the manufacturing system 10, the critical dimensions are measured and associated with manufacturing metrics determined for the completed devices. A first curve 220 shows the speed distribution of the devices as a function of the critical dimension, and a second curve 230 showing the yield distribution of the devices as a function of the critical dimension is also shown.

The target monitor 90 evaluates the manufacturing metric distributions and adjusts the target value used by the process controller 80 to control the operating recipe of the tool 30 based on a predetermined strategy. Managers of the manufacturing system 10 may determine manufacturing metric goals based on current business needs. For example, if inventory levels are low, a yield maximization strategy may be desired. If customer demand for high-speed devices is high, a speed maximization strategy may be desired. A combination strategy that maximizes both yield and speed may also be chosen. Other manufacturing metrics, such as power consumption may also be incorporated into the control strategy.

Based on the predetermined strategy, the target monitor 90 adjusts the target value used by the process controller 80. In the example illustrated in FIG. 2, the target monitor 90 will decrease the target value by approximately 0.5 units if a speed maximization strategy is desired. The target monitor 90 will increase the target value by approximately 1 unit if a yield maximization strategy is desired. The target monitor 90 will increase the target value by approximately 0.33 units if a strategy that maximizes speed and yield is desired.

The target monitor 90 may be adapted to adjust the target values for only a subset of the tools 30 in the manufacturing system 10. For example, one set of tools 30 may have target values selected based on one maximization strategy, and another set of tools 30 may use a different strategy. Controlling the tools 30 in this manner allows the overall output of the manufacturing system to be controlled to meet customer demand for various device speeds.

The frequency at which the target monitor 90 adjusts the target values may vary. For example, the target monitor 90 may adjust the target values once per shift, once per day, once per week, etc. Managers of the manufacturing system 10 may also use the manufacturing metric information collected by the target monitor 90 when making decisions regarding the maximization strategies.

Figure 3:
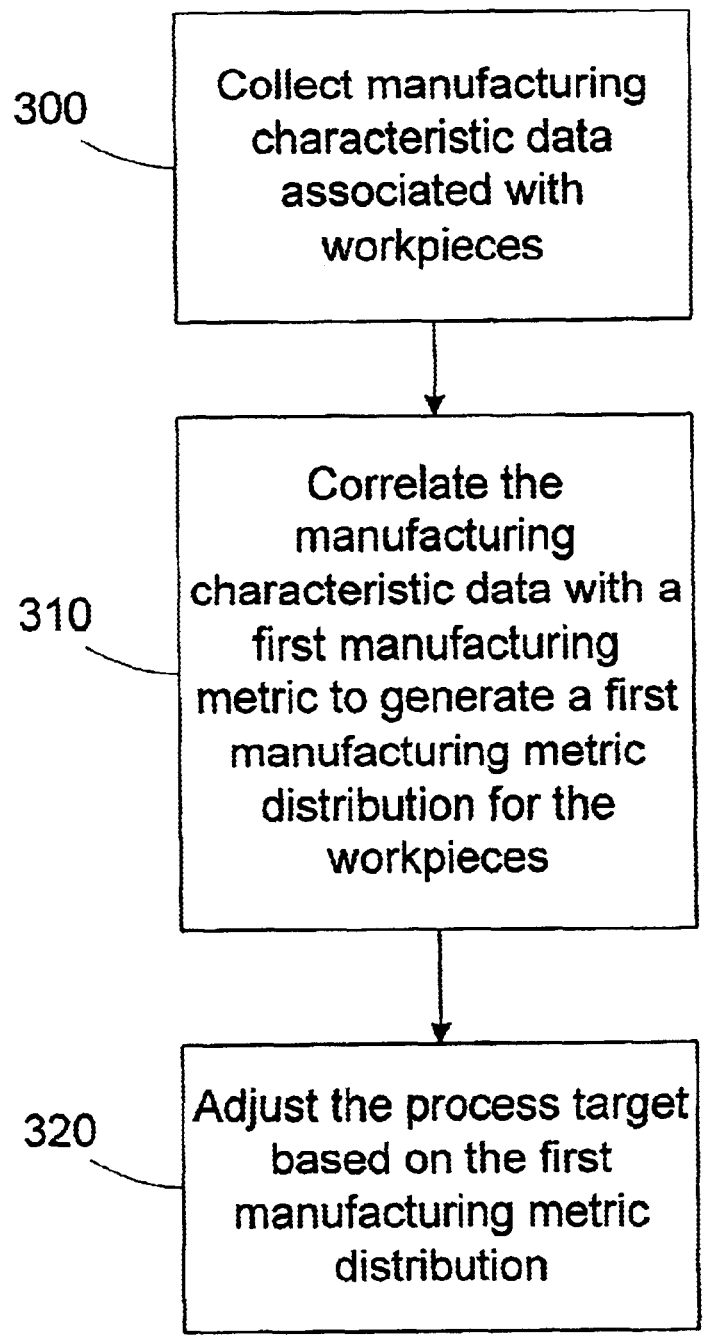
FIG. 3 is a simplified flow diagram of a method for controlling process target values based on manufacturing metrics in accordance with another illustrative embodiment of the present invention.

Turning now to FIG. 3, is a simplified flow diagram of a method for controlling process target values based on manufacturing metrics in accordance with another illustrative embodiment of the present invention is provided. In block 300, manufacturing characteristic data associated with the workpieces is collected. The manufacturing characteristic data may include critical dimension data of the transistor gate electrodes, for example. In block 310, the manufacturing characteristic data is correlated with a first manufacturing metric to generate a first manufacturing metric distribution for the workpieces. Exemplary manufacturing metrics include speed, yield, and power consumption. In block 320, the process target value of a processing tool is adjusted based on the first manufacturing metric distribution. The process target value may be adjusted to maximize the first manufacturing metric. A second manufacturing metric distribution may also be determined (e.g., speed and yield), and the process target value may be adjusted to maximize one of the metrics or both of the metrics (i.e., by intersecting the distributions).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling a tool adapted to process workpieces in accordance with an operating recipe based on a process target value, comprising:

collecting manufacturing characteristic data associated with the workpieces;

correlating the manufacturing characteristic data with a first manufacturing metric to generate a first manufacturing metric distribution for the workpieces; and adjusting the process target value based on the first manufacturing metric distribution.

2. The method of claim 1, further comprising measuring a manufacturing characteristic of the workpieces to generate the manufacturing characteristic data.

3. The method of claim 1, wherein correlating the manufacturing characteristic data with the first manufacturing metric comprises correlating the manufacturing characteristic data with the first manufacturing metric based on at least one of a speed rating of the workpiece, a yield associated with the workpieces, a power consumption rating of the workpieces, a switching voltage rating of the workpieces, and a leakage current rating of the workpieces.

4. The method of claim 1, further comprising:
correlating the manufacturing characteristic data with a second manufacturing metric to generate a second manufacturing metric distribution for the workpieces; and
adjusting the process target value based on the second manufacturing metric distribution.

5. The method of claim 4, wherein adjusting the process target value comprises adjusting the process target value to maximize one of the first and second metrics.

6. The method of claim 5, wherein adjusting the process target value comprises adjusting the process target value to maximize both of the first and second metrics.

7. The method of claim 5, wherein the first manufacturing metric comprises a speed rating of the workpiece, the second manufacturing metric comprises a yield associated with the workpiece, and adjusting the process target value comprises adjusting the process target value to maximize one of the speed rating and the yield of the workpieces.

8. The method of claim 1, further comprising: correlating the manufacturing characteristic data with a second manufacturing metric to generate a second manufacturing metric distribution for the workpieces; and
adjusting the process target value based on a combination of the first and second manufacturing metric distributions.

9. The method of claim 8, wherein adjusting the process target value comprises adjusting the process target value based on an intersection of the first and second manufacturing metric distributions.

10. The method of claim 1, further comprising:
correlating the manufacturing characteristic data with a second manufacturing metric to generate a second manufacturing metric distribution for the workpieces, each of the first and second manufacturing metrics having a priority; and
adjusting the process target value based on first and second manufacturing metric distributions and their associated priorities.

11. The method of claim 1, wherein collecting the manufacturing characteristic data comprises collecting critical dimension data associated with the workpieces.

12. The method of claim 11, wherein the workpieces comprise semiconductor devices including transistors, and collecting the manufacturing characteristic data comprises collecting critical dimension data associated a transistor gate electrode of the transistors.

13. A manufacturing system, comprising:
a processing tool adapted to process workpieces in accordance with an operating recipe based on a process target value; and
a target monitor adapted to collect manufacturing characteristic data associated with the workpieces, correlate the manufacturing characteristic data with a first manufacturing metric to generate a first manufacturing metric distribution for the workpieces, and adjust the process target value based on the first manufacturing metric distribution.

14. The system of claim 13, further comprising a data store adapted to store the manufacturing characteristic data and data associated with the first manufacturing metric.

15. The system of claim 13, further comprising a metrology tool adapted to measure a manufacturing characteristic of the workpieces to generate the manufacturing characteristic data.

16. The system of claim 13, wherein the target monitor is adapted to correlate the manufacturing characteristic data with the first manufacturing metric based on at least one of a speed rating of the workpiece, a yield associated with the workpieces, a power consumption rating of the workpieces, a switching voltage rating of the workpieces, and a leakage current rating of the workpieces.

17. The system of claim 13, wherein the target monitor is further adapted to correlate the manufacturing characteristic data with a second manufacturing metric to generate a second manufacturing metric distribution for the workpieces and adjust the process target value based on the second manufacturing metric distribution.

18. The system of claim 17, wherein the target monitor is adapted to adjust the process target value to maximize one of the first and second metrics.

19. The system of claim 17, wherein the target monitor is adapted to adjust the process target value to maximize both of the first and second metrics.

20. The system of claim 17, wherein the first manufacturing metric comprises a speed rating of the workpiece, the second manufacturing metric comprises a yield associated with the workpiece, and the target monitor is adapted to adjust the process target value to maximize one of the speed rating and the yield of the workpieces.

21. The system of claim 13, wherein the target monitor is further adapted to correlate the manufacturing characteristic data with a second manufacturing metric to generate a second manufacturing metric distribution for the workpieces and adjust the process target value based on a combination of the first and second manufacturing metric distributions.

22. The system of claim 21, wherein the target monitor is adapted to adjust the process target value based on an intersection of the first and second manufacturing metric distributions.

23. The system of claim 13, wherein the target monitor is further adapted to correlate the manufacturing characteristic data with a second manufacturing metric to generate a second manufacturing metric distribution for the workpieces, each of the first and second manufacturing metrics having a priority, and adjust the process target value based on first and second manufacturing metric distributions and their associated priorities.

24. The system of claim 13, wherein the manufacturing characteristic data comprises critical dimension data associated with the workpieces.

25. The system of claim 13, wherein the workpieces comprise semiconductor devices including transistors, and the manufacturing characteristic data comprises critical dimension data associated a transistor gate electrode of the transistors.

26. A manufacturing system for controlling a tool adapted to process workpieces in accordance with an operating recipe based on a process target, comprising:
means for collecting manufacturing characteristic data associated with the workpieces;
means for correlating the manufacturing characteristic data with a first manufacturing metric to generate a first manufacturing metric distribution for the workpieces; and
means for adjusting the process target value based on the first manufacturing metric distribution.

27. A method for controlling a tool adapted to process workpieces in accordance with an operating recipe based on a process target value, comprising:

collecting speed rating data associated with the workpieces;

correlating the speed rating data with a first manufacturing metric to generate a first manufacturing metric distribution for the workpieces; and adjusting the process target value based on the first manufacturing metric distribution.

28. The method of claim 27, wherein collecting the manufacturing characteristic data comprises collecting critical dimension data associated with the workpieces.

29. A method for controlling a tool adapted to process workpieces in accordance with an operating recipe based on a process target value, comprising:

collecting yield data associated with the workpieces;

correlating the yield data with a first manufacturing metric to generate a first manufacturing metric distribution for the workpieces; and adjusting the process target value based on the first manufacturing metric distribution.

30. The method of claim 29, wherein collecting the manufacturing characteristic data comprises collecting critical dimension data associated with the workpieces.

31. A method for controlling a tool adapted to process workpieces in accordance with an operating recipe based on a process target value, comprising:

collecting power consumption data associated with the workpieces;

correlating the power consumption data with a first manufacturing metric to generate a first manufacturing metric distribution for the workpieces; and adjusting the process target value based on the first manufacturing metric distribution.

32. The method of claim 31, wherein collecting the manufacturing characteristic data comprises collecting critical dimension data associated with the workpieces.

33. A method for controlling a tool adapted to process workpieces in accordance with an operating recipe based on a process target value, comprising:

collecting manufacturing characteristic data associated with the workpieces;

correlating the manufacturing characteristic data with a first manufacturing metric to generate a first manufacturing metric distribution for the workpieces;

correlating the manufacturing characteristic data with a second manufacturing metric to generate a second manufacturing metric distribution for the workpieces; and adjusting the process target value based on at least one of the first and second manufacturing metric distributions.

34. The method of claim 33, wherein adjusting the process target value comprises adjusting the process target value to maximize one of the first and second metrics.

35. The method of claim 33, wherein adjusting the process target value comprises adjusting the process target value to maximize both of the first and second metrics.

36. The method of claim 33, wherein each of the first and second manufacturing metrics having a priority, and adjusting the process target value comprises adjusting the process target value based on first and second manufacturing metric distributions and their associated priorities.

37. The method of claim 33, wherein correlating the manufacturing characteristic with the first manufacturing metric comprises correlating the manufacturing characteristic with one of the manufacturing metrics selected from a group consisting of a speed rating of the workpiece, a yield associated with the workpieces, a power consumption rating of the workpieces, a switching voltage rating of the workpieces, and a leakage current rating of the workpieces, and correlating the manufacturing characteristic with the second manufacturing metric comprises correlating the manufacturing characteristic with one of the manufacturing metrics selected from the group not used for correlating with the manufacturing characteristic for generating the first manufacturing metric.

38. A manufacturing system, comprising:

a processing tool adapted to process workpieces in accordance with an operating recipe based on a process target value; and a target monitor adapted to collect speed rating data associated with the workpieces, correlate the speed rating data with a first manufacturing metric to generate a first manufacturing metric distribution for the workpieces, and adjust the process target value based on the first manufacturing metric distribution.

39. The system of claim 38, wherein the manufacturing characteristic data comprises critical dimension data associated with the workpieces.

40. A manufacturing system, comprising:

a processing tool adapted to process workpieces in accordance with an operating recipe based on a process target value; and a target monitor adapted to collect yield data associated with the workpieces, correlate the yield data with a first manufacturing metric to generate a first manufacturing metric distribution for the workpieces, and adjust the process target value based on the first manufacturing metric distribution.

41. The system of claim 40, wherein the manufacturing characteristic data comprises critical dimension data associated with the workpieces.

42. A manufacturing system, comprising:

a processing tool adapted to process workpieces in accordance with an operating recipe based on a process target value; and a target monitor adapted to collect power consumption data associated with the workpieces, correlate the power consumption data with a first manufacturing metric to generate a first manufacturing metric distribution for the workpieces, adjust the process target value based on the first manufacturing metric distribution.

43. The system of claim 42, wherein the manufacturing characteristic data comprises critical dimension data associated with the workpieces.

44. A manufacturing system, comprising:

a processing tool adapted to process workpieces in accordance with an operating recipe based on a process target value; and a target monitor adapted to collect manufacturing characteristic data associated with the workpieces, correlating the manufacturing characteristic data with a first manufacturing metric to generate a first manufacturing metric distribution for the workpieces, correlate the manufacturing characteristic data with a second manufacturing metric to generate a second manufacturing metric distribution for the workpieces, and adjust the process target value based on at least one of the first and second manufacturing metric distributions.

45. The method of claim 44, wherein the target monitor is adapted to adjust the process target value to maximize one of the first and second metrics.

46. The method of claim 44, wherein the target monitor is adapted to adjusting the process target value to maximize both of the first and second metrics.

47. The method of claim 44, wherein each of the first and second manufacturing metrics having a priority, and the target monitor is adapted to adjusting the process target value based on first and second manufacturing metric distributions and their associated priorities.

48. The method of claim 44, wherein the first manufacturing metric comprises a manufacturing metric selected from a group consisting of a speed rating of the workpiece, a yield associated with the workpieces, a power consumption rating of the workpieces, a switching voltage rating of the workpieces, and a leakage current rating of the workpieces, the second manufacturing metric comprises a manufacturing metric selected from a group consisting of a speed rating of the workpiece, a yield associated with the workpieces, a power consumption rating of the workpieces, a switching voltage rating of the workpieces, and a leakage current rating of the workpieces, and the first and second manufacturing metrics are not the same.

* * * * *